United States Patent [19]

Kawamoto et al.

[11] Patent Number: 5,269,397
[45] Date of Patent: Dec. 14, 1993

[54] ROTARY DAMPER WITH IMPROVED CONNECTION BETWEEN CAP AND HOUSING

[75] Inventors: Masanobu Kawamoto; Keiji Yamaguchi; Norio Tokahashi, all of Yokohama, Japan

[73] Assignee: Nifco Inc., Yokohama, Japan

[21] Appl. No.: 848,182

[22] Filed: Mar. 10, 1992

[30] Foreign Application Priority Data

Mar. 11, 1991 [JP] Japan .................... 3-69473

[51] Int. Cl.$^5$ .................... F16F 9/12; F16D 57/00
[52] U.S. Cl. .................... 188/290; 188/322.5; 16/82; 192/58 B; 192/112
[58] Field of Search .................... 188/293, 296, 290, 306, 188/322.5; 74/574; 16/82, 85, DIG. 9, DIG. 10; 192/58 B, 112

[56] References Cited

U.S. PATENT DOCUMENTS 4,527,675  7/1985  Omata et al. ............ 188/322.5 X
4,796,733  1/1989  Nakayama ............... 188/290 X

FOREIGN PATENT DOCUMENTS 0035234  2/1990  Japan ..................... 188/322.5

Primary Examiner—Robert J. Oberleitner
Assistant Examiner—Josie A. Ballato
Attorney, Agent, or Firm—Oblon, Spivak, McClelland, Maier & Neustadt

[57] ABSTRACT

A rotary damper includes a dish-shaped housing having a depression surrounded by a cylindrical wall, a viscous fluid contained in the depression, a damping rotor accommodated in the viscous fluid, and a cap covering the dish-shaped housing with a shaft of the damping rotor projecting through a central hole thereof. The cylindrical wall is provided at the base of its external periphery with a sloped annular portion of downward increasing diameter. A lower edge portion of a circular wall of the cap is contacted with the slope of the sloped annular portion during welding of the cap to the dish-shaped housing.

1 Claim, 3 Drawing Sheets

ROTARY DAMPER WITH IMPROVED CONNECTION BETWEEN CAP AND HOUSING

BACKGROUND OF THE INVENTION

1. Field of the Invention

This invention relates to a rotary damper for use with a rotating or sliding member such as the cover of a cassette tape recorder, a computer floppy disk drive, a glove compartment or an ash tray in a car or other such device, and which damps rotating or sliding movement of the member making use of the viscosity of grease or silicone oil.

2. Description of the Prior Art

U.S. Pat. No. 4,701,229 discloses a rotary damper wherein a dish-shaped housing has a circular depression, viscous fluid is charged into the depression, a damping rotor with a revolving shaft standing from the center thereof is horizontally accommodated in the viscous fluid in a rotatable manner, and a cap having a central hole for passage of the revolving shaft of the aforesaid damping rotor therethrough and a cylindrical wall of the dish-shaped housing surrounding the aforesaid depression are fixed to each other by welding so that the depression is covered by the cap from the upper side.

In the aforesaid rotary damper, a downward inner circular protruding wall is provided along the external periphery of the cap, while an upward outer circular protruding wall is provided along the internal periphery of the cylindrical wall of the dish-shaped housing, the external peripheral surface of the inner circular protruding wall and the internal peripheral surface of the outer circular protruding wall are opposed to each other, and welding is effected by pressing a high-frequency welder horn onto the two circular protruding walls to melt upper edge sections of the two circular protruding walls by high-frequency vibration.

The engagement inevitably leaves a small clearance between the external peripheral surface of the cap including the aforesaid inner circular protruding wall and the internal peripheral surface of the cylindrical wall including the outer circular protruding wall, and a lower edge of this small clearance communicates with the inside of the depression of the dish-shaped housing filled with viscous fluid. For this reason, the viscous fluid is drawn into the thin clearance by capillary attraction. As a result, the section to be welded may sometimes be wetted by the viscous fluid. If this happens, the weld may be weak or irregular in shape so that the cap may come off from the dish-shaped housing or the viscous fluid may leak to outside when the fluid gets hot and its volume expands.

An object of this invention is to provide a rotary damper which will not come apart owing to inadequate strength of the weld between the cap and the housing, and which will not suffer viscous fluid leakage.

SUMMARY OF THE INVENTION

To achieve the object described above, the present invention provides a rotary damper comprising a damping rotor having a central revolving shaft, a dish-shaped housing having a bottom wall and a cylindrical wall to define a round depression being filled with viscous fluid, and a sloped annular portion with a diameter increasing downward provided at an external periphery of a lower edge of the cylindrical wall, the damping rotor being rotatably accommodated in the round depression filled with the viscous fluid, and a cap having a central hole for passage of the revolving shaft of the damping rotor and a circular wall provided along an external periphery thereof for being fitted on the external periphery of the cylindrical wall of the dish-shaped housing, the circular wall having a lower edge with an internal periphery brought into contact with a slope of the sloped annular portion of the dish-shaped housing for welding the cap so as to cover the round depression from above.

As described above, in this invention, the sloped annular portion provided along the external periphery of the lower edge section of the cylindrical wall surrounding the round depression of the dish-shaped housing filled with viscous fluid and the internal periphery of the lower edge section of the cap are melted for welding. Owing to this arrangement, the viscous fluid charged into the round depression of the dish-shaped housing is prevented from adversely affecting the welded section during welding. As a result, proper welding is ensured and, breakup of the rotary damper and leakage of the viscous fluid to the outside are prevented.

The above and other objects and features of this invention will become more apparent to those skilled in the art as the disclosure of the invention is made herein below with reference to the accompanying drawings.

BRIEF DESCRIPTION OF THE DRAWINGS

FIG. 1b is an enlarged view of the circled area in FIG. 1a;

DESCRIPTION OF THE PREFERRED EMBODIMENT

Figure 1A:
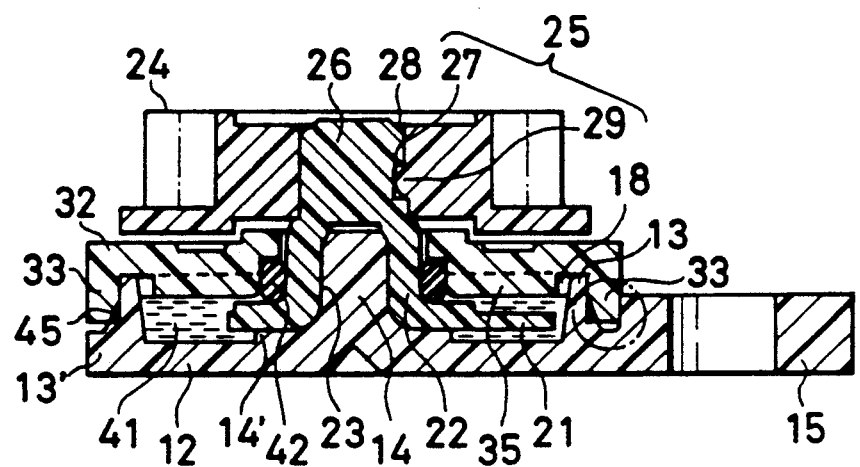
FIG. 1a is a cross-sectional view taken along line I—I in FIG. 3 for illustrating an embodiment of the rotary damper according to this invention.
Figure 1B:
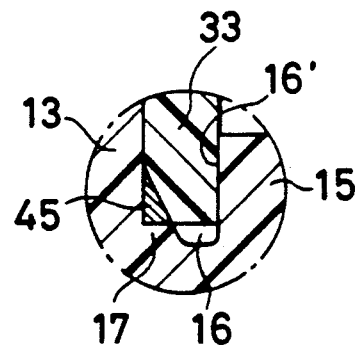
Figure 2:
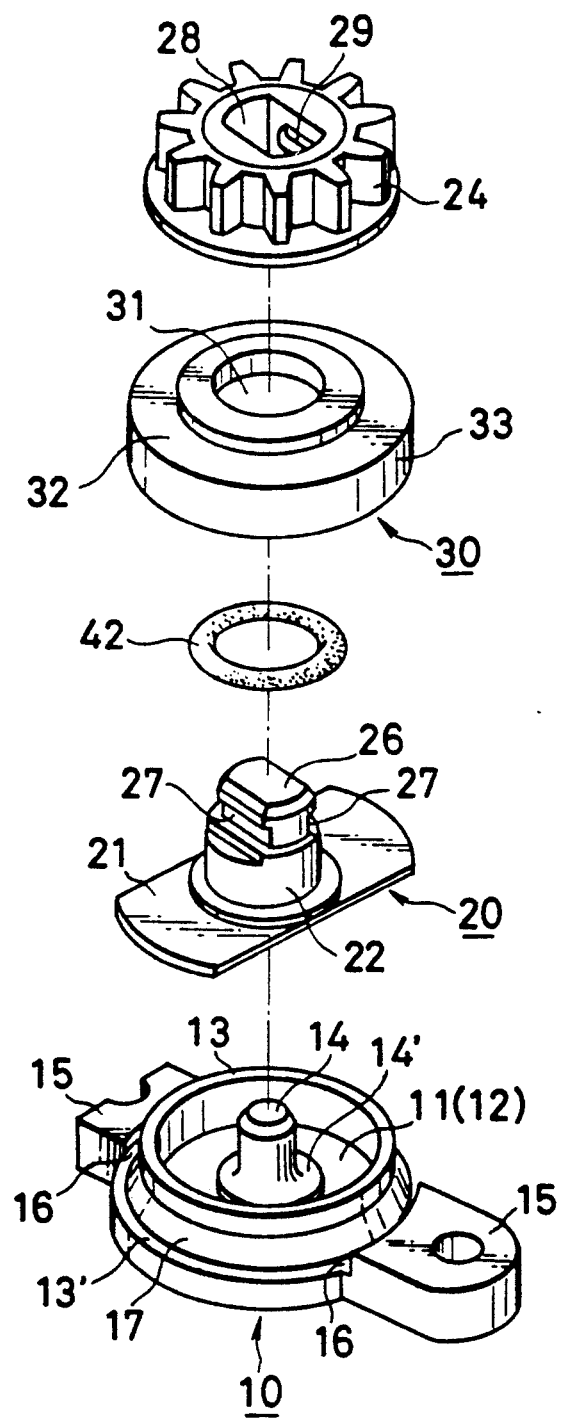
FIG. 2 is an exploded perspective view of the rotary damper shown in FIG. 1.

In the embodiment illustrated in the drawings, numeral 10 indicates a dish-shaped housing, numeral 20 indicates a damping rotor, and numeral 30 indicates a cap. All of these components are plastic moldings.

The dish-shaped housing 10 has a bottom wall 12 which forms a round depression 11, a cylindrical wall 13 which stands from the external periphery of the circular bottom wall 12, a fixed shaft 14 which stands from the center of the bottom wall, and two fixed arms 15 which protrude from the cylindrical wall 13 in the radial direction. A specified quantity of viscous fluid 41 such as, for instance, silicone oil is charged into the round depression 11.

The damping rotor 20 is oblong and has two opposed arcuate peripheral portions at an external periphery thereof. The curvature of the arcuate peripheral portions is smaller than the curvature of the inside surface of the cylindrical wall 13 of the dish-shaped housing 10. The damping rotor 20 comprises a damping plate 21 which rotates horizontally just above the bottom wall 12 inside the round depression 11 and a revolving shaft 22 which stands from the center of the damping plate 21. The revolving shaft 22 has a shaft hole 23 open downward which is fitted on the fixed shaft 14 of the dish-shaped housing 10 from above, and a means 25 for fixing a pinion 24 to which rotation is delivered. Numeral 42 designates an O-ring which engages with the external periphery of the revolving shaft 22 of the damping rotor 20.

The fixing means 25 comprises notches 27 formed in both parallel side surfaces of a shaft 26 with an oblong cross-section which stands from an upper edge section of the revolving shaft 22 and inward protrusions 29 protruding from both parallel side surfaces of an oblong central hole 28 of the pinion 24 to be engaged with the aforesaid shaft 26. The shapes of the shaft 26 of the damping rotor 20 and the central hole 28 of the pinion 24 are not limited to oblong and may instead be polygonal.

The cap 30 has a round cover portion 32 having a central hole 31 for passage of the revolving shaft 22 of the damping rotor 20 therethrough and a circular wall 33 extending downward from the external periphery of the cover portion 32 and engaging with the external periphery of the cylindrical wall 13 of the dish-shaped housing 10.

A lower edge 13' of the cylindrical wall 13 of the dish-shaped housing 10 is located at a lower position than the upper surface of the fixed arms 15, For this reason, an arcuate groove 16 is formed along the cylindrical wall 13 at the upper surface of the fixed arm 15 such that the bottom of the arcuate groove 16 coincides with the lower edge 13' at the external periphery of the cylindrical wall 13. When the circular wall 33 of the cap 30 is engaged with the outside of the cylindrical wall 13 from above, the lower section of the round wall 33 engages with the arcuate grooves 16, while the external periphery of the lower section of the circular wall 33 closely contacts an external peripheral wall surface 16' of the arcuate groove 16. At the external periphery of the lower edge section of the cylindrical wall 13 is formed a sloped annular portion 17 with a diameter increasing downward. To assemble the rotary damper into the aforesaid configuration, the shaft hole 23 in the bottom of the revolving shaft 22 of the damping rotor 20 is fitted on the fixed shaft 14 of the dish-shaped housing 10 from above so as to be supported inside of the round depression 11 in a rotatable manner. At this time, an upward raised portion 14' around the base of the fixed shaft 14 comes into contact with the periphery of the shaft hole 23 of the damping rotor 20, as shown in the figures. (Alternatively it is possible to provide a downward circular raised section around the shaft hole 23 for contacting the periphery of the fixed shaft 14.) The result in either case is that the bottom surface of the damping plate 21 of the damping rotor 20 is held above the top surface of the bottom wall 12 of the round depression 11.

Before or after setting the damping rotor 20 in the round depression 11, a specified quantity of viscous fluid 41 is charged into the round depression 11 so that the damping plate 21 can rotate horizontally in the viscous fluid 41, and the O-ring 42 is set around the revolving shaft 22.

Next, the revolving shaft 22 of the damping rotor 20 is passed through the central hole 31 of the cap 30, the cap 30 is pressed onto the dish-shaped housing 10 to cover the latter, and the circular wall 33 of the cap 30 is engaged with the external periphery of the cylindrical wall 13 of the dish-shaped housing 10. The internal periphery of the lower edge section of the circular wall 33 is brought into contact with the slope of the sloped annular portion 17 from above and the cap 30 is pressed down until the inner surface of the cover portion 32 contacts the upper edge of the cylindrical wall 13. At the same time, the internal periphery of the lower edge section of the circular wall 33 and the sloped annular portion 17 are melted by application of supersonic waves or by pressing a high frequency horn thereon to apply high frequency vibration thereto.

Since the external periphery of the circular wall 33 engaged with the arcuate groove 16 of the fixed arm 15 contacts the external peripheral wall surface 16' of the arcuate groove, it does not expand outward on the slope of the sloped annular portion 17. However, the remaining portions of the circular wall 33 follow the slope of the sloped annular portion 17 and expand outward. As a result, these portions are likely not to be fully melted. This is apt to cause faulty welding.

Figure 3:
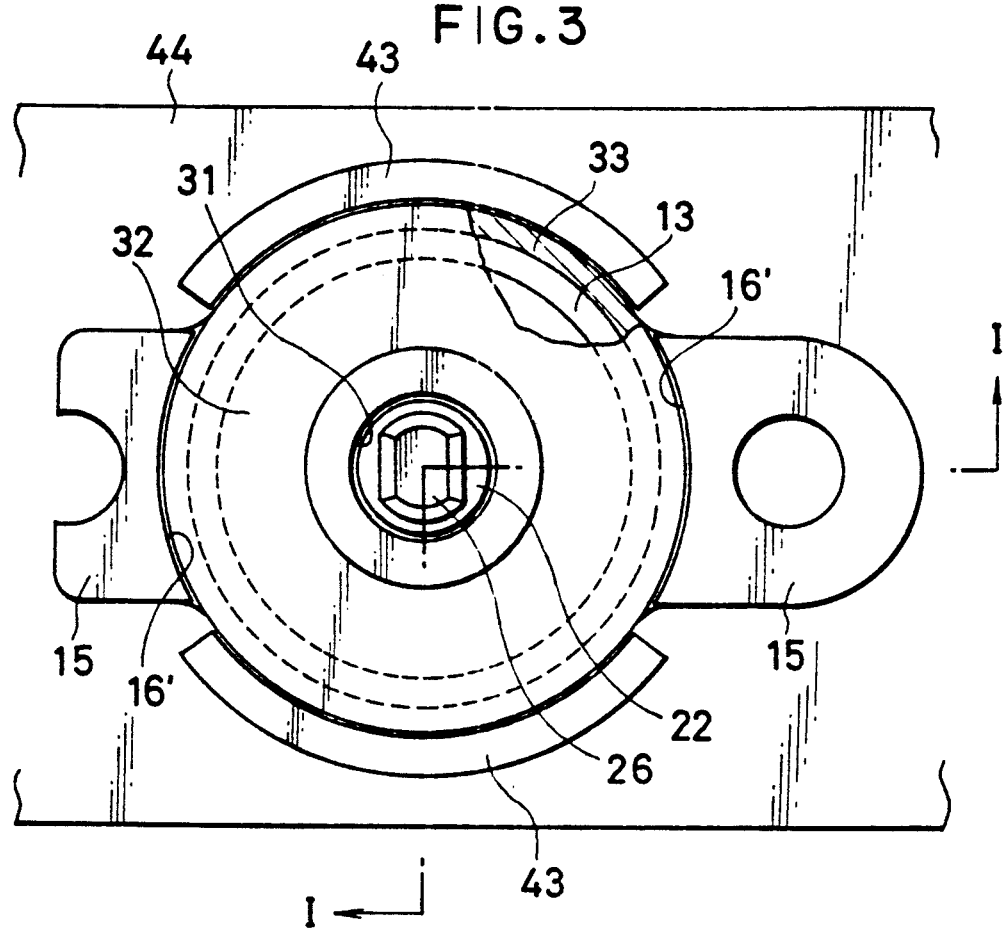
FIG. 3 is a plan view of the rotary damper of FIG. 1 shown as set in a tool for welding.
Figure 4:
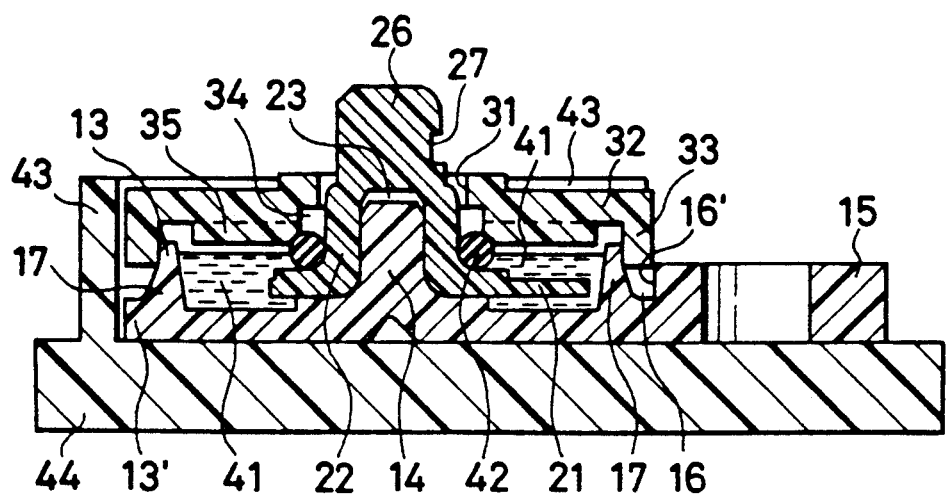
FIG. 4 is a cross-sectional view of the rotary damper accommodated in the tool taken along line I—I in FIG. 3.

For this reason, as shown in FIGS. 3 and 4, the welding is conducted using a tool 44 having a pair of facing arcuate walls 43 for surrounding the aforesaid circular wall 33 so as to prevent the aforesaid remaining portions of the circular wall 33 from expanding outward.

Thus, when the melted portions 45 of the internal periphery of the lower edge section of the circular wall 33 and of the sloped annular portion 17 solidify, the cap 30 and the dish-shaped housing 10 are closely welded to each other, and the O-ring 42 engaged with the revolving shaft 22 of the rotor 20 is strongly compressed onto the external surface of the revolving shaft 22 at the internal periphery of an annular stepped portion 34 undercut in the lower half of the internal peripheral surface of the central hole 31 of the cap 30. The viscous fluid 41 is therefore prevented from leaking to the outside along the external surface of the revolving shaft 22.

A small clearance is inevitably formed between the external periphery of the cylindrical wall 13 of the dish-shaped housing 10 and the circular wall 33 of the cap 30 engaged therewith from the outside, and the viscous fluid is drawn up into the small clearance during welding, wetting the external peripheral surface of the sloped annular portion 17. This is a cause for faulty welding.

To prevent this, the inner surface of the cover portion 32 of the cap 30 is provided with an annular thick portion 35 having a diameter which is a little smaller than the inner diameter of the downward cylindrical wall 13 so as to maintain an annular space 18 between itself and the internal periphery of the upper edge section of the cylindrical wall 13. This annular space 18 prevents the capillary attraction in the small clearance between the external periphery of the cylindrical wall 13 and the internal periphery of the circular wall 33 of the cap from affecting the round depression 11 of the dish-shaped housing with the viscous fluid.

The quantity of the viscous fluid 41 to be charged into the round depression 11 of the dish-shaped housing accommodating the damping plate 21 of the damping rotor 20 is decided so that the level of the viscous fluid coincides with the lower surface of the annular thick portion 35 of the cover portion 32 of the cap. With this configuration, when the volume of the viscous fluid expands due to temperature rise, the aforesaid annular space 18 acts as a buffer tank for absorbing the expanded volume of the viscous fluid.

Finally, the central hole 28 of the pinion 24, which has the same shape as the shaft 26, is aligned with and fitted on the shaft 26 of oblong cross-section standing on the upper edge section of the revolving shaft 22 of the damping rotor 20 which at this time is protruding upward from the central hole 31 of the cover portion 32 of the cap 30, and the pinion 24 is fixed to the revolving shaft 22 by mating the notches 27 with the protrusions 29.

The rotary damper thus assembled is fixed by screws (not shown) passed through the fixed arms 15 and a rack or a gear (not shown) is engaged with the pinion to deliver rotation thereto. When the damping plate 21 immersed in the viscous fluid 41 rotates together with the pinion 24, the rotation is damped by the viscosity of the viscous fluid, so that movement of the components delivering the rotation via the rack or gear to the pinion 24 becomes smooth.

As explained above, the internal periphery of the lower edge section of the circular wall of the cap is contacted with the slope of the sloped annular portion provided at the external periphery of the lower edge section of the cylindrical wall surrounding the round depression on the dish-shaped housing, and the sloped annular portion and the internal periphery of the lower edge section of the cap are melted for welding, so that the viscous fluid charged into the round depression of the dish-shaped housing does not adversely affect the welded section during welding. With this configuration, all possibility of the weld having insufficient strength or irregular shape is eliminated, leakage of the viscous fluid to outside and detachment of the cap from the dish-shaped housing, which causes the damper to fall apart, can be prevented.

What is claimed is:
1. A rotary damper comprising:
a damping rotor having a central revolving shaft;
a dish-shaped housing having a bottom wall and a cylindrical wall to define a round depression being filled with viscous fluid, and a sloped annular portion with a diameter increasing downward provided at an external periphery of a lower edge of said cylindrical wall, said damping rotor being rotatably accommodated in said round depression filled with the viscous fluid; and
a cap having a central hole for passage of said revolving shaft of said damping rotor, an inner bottom provided with a downwardly directed annular thick portion with a diameter smaller than an inner diameter of said cylindrical wall of said dish-shaped housing and forming a gap in cooperation with said cylindrical wall of said dish-shaped housing, and a circular wall provided along an external periphery thereof for being fitted on the external periphery of said cylindrical wall of said dish-shaped housing;
said circular wall of said cap having a lower edge with an internal periphery brought into contact from above with a slope of said sloped annular portion of said dish-shaped housing for welding said cap so as to cover said round depression from above and define an annular space between an external periphery of said annular thick portion of said cap and an internal periphery of said cylindrical wall of said dish-shaped housing.

* * * * *